Jan. 19, 1954  F. FUA ET AL  2,666,856
X-RAY FLUORESCENT RESPONSE INTENSIFIER
Filed Oct. 8, 1946  2 Sheets-Sheet 2

INVENTORS
Frederic Fua
Robert C. Woods
BY
Pennie, Edmonds, Morton & Barrows
ATTORNEYS Patented Jan. 19, 1954

2,666,856

UNITED STATES PATENT OFFICE 2,666,856

X-RAY FLUORESCENT RESPONSE INTENSIFIER

Frederic Fua, New York, N. Y., and Robert C. Woods, Montclair, N. J., assignors to X-Ray Electronic Corporation, New York, N. Y., a corporation of New York Application October 8, 1946, Serial No. 702,034

1 Claim. (Cl. 250—71)

This invention relates to an X-ray fluorescent response intensifier and provides improved means for measuring X-rays, in particular for measuring the intensity of X-rays of various wave lengths by use of a fluorescent material exposed to such X-rays, an electron-emission type photocell exposed to the fluorescent material, and a galvanometer, or other suitable means for measuring the photocell response.

One field of particular usefulness for this invention is in apparatus of the type disclosed in the Fua and Woods application, Serial No. 558,928, filed October 16, 1944, now Patent No. 2,525,292. In such apparatus the wave length of the X-ray beam used to penetrate the material being measured may be advantageously varied according to the nature of that material.

As was first disclosed in the related and copending Fua and Woods application, Serial No. 658,903, filed April 2, 1946, now abandoned as fully covered by the instant application, the usefulness of an electron-emission type photocell for measuring X-ray is materially increased if no X-ray is permitted to impinge upon the photosensitive cathode, but, instead, is directed first upon fluorescent material, only the light from which is permitted to fall upon such photocathode. Further, it has been known for many years that the response of fluorescent material to X-ray varies not only with the intensity of the impinging X-ray, but also with its wave length. Thus if a penetrating high frequency, and hence short wave length, X-ray is used, the response of fluorescent material is less, except for the characteristic frequency of the fluorescent material itself. Otherwise stated, less and less energy from the X-ray beam is absorbed by the fluorescent crystals as the wave length of the impinging radiation is decreased and, therefore, less and less visible light is emitted.

The conflict between the necessity for using short wave length X-ray in the measurement of certain material and the difficulty of obtaining sufficient fluorescent response to such rays is largely overcome by the present invention, which serves not only to transform relatively ineffective X-ray wave lengths impinging upon a fluorescent layer into emanations of a frequency causing greater fluorescence, but also positively increases the fluorescent response of the layer to X-rays of any wave length.

It has been known almost since the inception of X-ray technology that the secondary emanations form certain materials receiving an X-ray beam can increase the useful response of photographic materials to X-ray and some recent work has been done in France employing the secondary emanations from deposited silver on a developed photographic negative to make direct negative copies by exposure to X-ray.

We have now discovered that similar secondary emanations can be employed to so increase the response of fluorescent material to X-ray, and especially to the more penetrating wave lengths, that an electron-emission type photocell can be employed as the detecting means in various X-ray measuring and gauging apparatus, with adequate sensitivity to permit the most delicate measurements while using the optimum wave length for the material being measured. The increased sensitivity so obtained is an important factor in permitting the substitution of an electron-emission type photocell for a Geiger counter, with many attendant advantages described elsewhere.

We have illustrated several embodiments of our invention diagrammatically in the accompanying drawings, in which.

Figure 1:
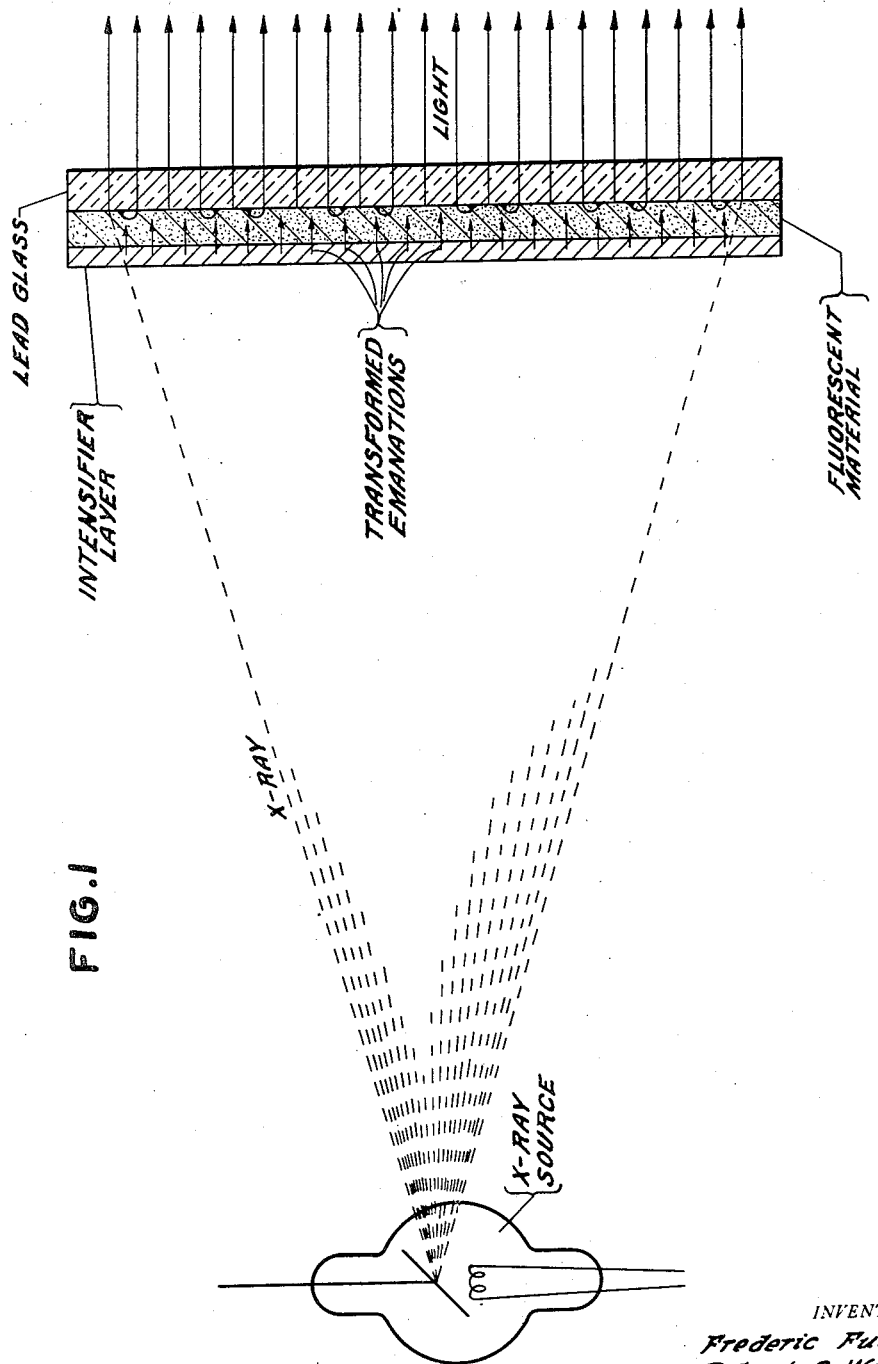
Fig. 1 illustrates diagrammatically the operation of the present invention.

As illustrated in Fig. 1, an intensifier layer is provided having deposited upon it a layer of fluorescent material and superposed upon this is a lead glass sheet. A source of X-ray to be measured emanates rays impinging first upon the intensifier layer. The optimum material from which this intensifier is to be made depends upon the wave length of impinging X-ray, which, in turn, is a function of the target material of the X-ray source and the excitation voltage.

A suitable intensifier can be made of a thin layer of metal, for example of lead, aluminum, copper, tungsten or molybdenum. The optimum intensifier material will also depend upon the nature of the fluorescent material used. The thickness of the layer will naturally vary with the X-ray absorption qualities of the material selected, and the wave length of the X-ray used. The thickness in most cases is relatively slight and the layer can be advantageously applied by known spraying techniques.

This metallic layer functions as an intensifier of the fluorescent effect of the impinging X-ray in two ways. First, it absorbs the shorter wave length rays from the X-ray source, which are of relatively weak effect in exciting the fluorescent layer, and transforms the energy thus absorbed into longer wave length emanations which are re-emitted into the fluorescent layer. Second, by the direct contact between the fluorescent crystals and the intensifier layer, a further increase in the excitation of the fluorescent layer is achieved as those crystals are then activated not only by the energy of the re-emitted, longer wave length rays, but also by photoelectron emission from the intensifier layer.

In selecting an intensifier layer for use with a particular fluorescent material and with X-ray of a particular frequency spectrum, the material chosen and its thickness will be that which produces the greatest measurable emission of detectable light by the fluorescent material.

As was first disclosed in application Serial No. 658,903, the amount of light emitted by the fluorescent layer in a direction away from the X-ray source can be materially increased by light-reflective properties of a "mirror" surface, for example, the surface of the intensifier layer in contact with the fluorescent material, and a lead glass screen is useful in protecting photocell cathodes from impinging X-ray.

As a specific example of the construction of an X-ray fluorescent response intensifier according to this invention, we have found that a layer of shiny aluminum in contact with a layer of cadmium tungstate will produce a large increase in the measurable emission of light detectable by an electron multiplier photocell from the fluorescent excitation of the tungstate that results from exposure to an X-ray beam produced with an excitation voltage of 50 kv. and a copper target.

Figure 2:
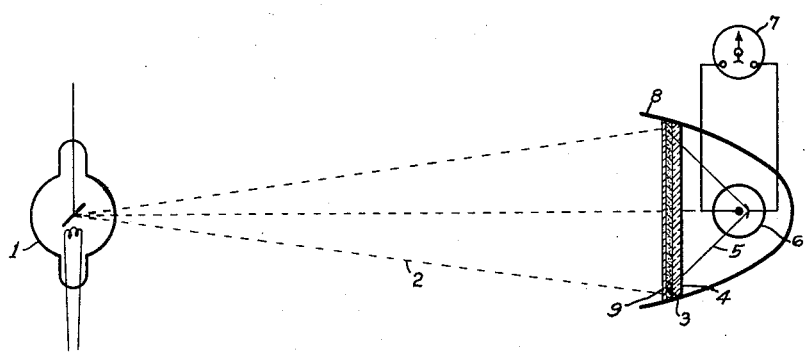
Fig. 2 is a schematic illustration of a complete X-ray measuring system employing that invention.

Referring now to Fig. 2, an X-ray tube 1 emitting a beam of X-rays 2, the intensity of which it is desired to measure, is so disposed that the X-rays 2 fall on an intensifier layer 9, such as aluminum foil having a light reflective in a surface. The rays 2 penetrate the layer 9 and reach a layer of fluorescent material 3 deposited on a lead glass screen 4. The action of the layer 9 previously described is to intensify the response of the fluorescent material 3 to the incident X-ray, then also to reflect the outwardly directed light produced in that fluorescent layer inward through the lead glass screen 4. The screen 4 is opaque to the rays 2, but transparent to the light produced by the excited fluorescent material 3, the light rays 5 from which pass through the screen 4 and fall on the photo-sensitive cathode of the photocell 6, causing it to produce a current through the galvanometer 7 whose needle will thus be deflected. A shield 8 is provided to keep all light, except that produced by fluorescent layer 3 from reaching photocell 6. The combination of elements here disclosed is especially useful in making the response of needle 7 a reliably accurate and precise measure of the intensity of X-ray beam 2 reaching the intensifier layer 9. It is the stability of this combination which makes it especially suitable for use in gaging work as well, of course, as the increased sensitivity advantages previously described.

Figure 3:
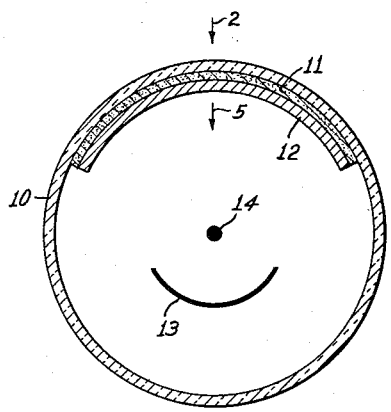
Fig. 3 is a section through an electron-emitting photocell especially constructed to embody the invention.

A suitable structure incorporating this invention directly to the structure of the photocell is shown in Fig. 3 in which the glass tube 10 of the cell itself, suitably coated with a metallic material, forms the mirror and intensifier layer, the fluorescent layer 11 is deposited on the inner wall of the tube 10 opposite the photocathode 13 and the lead glass screen 12 is affixed to the tube 10 completely shielding layer 11 from cathode 13. When the tube is exposed to X-ray 2 going to the direction of the arrow, the curvature of tube wall 10 and cathode 13 cooperate to insure that nearly all the light 5 produced in layer 11 (in response to the impinging X-ray 2 and the secondary excitation produced by the intensifier layer) is effective in producing an electric potential between cathode 13 and anode 14, while screen 12 completely protects cathode 13 from the X-ray.

Having described our invention in detail, with reference to specific uses and apparatus, we do not wish to be limited to those details, but, instead, by the scope of the appended claim.

We claim:

In a mensuration system utilizing a photocell activated by fluorescence induced by X-ray, the combination including a source of X-ray, a photocell in the path of X-ray from said source, and a composite X-ray opaque screen element interposed in said path and disposed to put said photocell in its X-ray shadow, said screen element comprising a lead glass sheet disposed on the side toward said photocell, a layer of fluorescent material deposited on said lead glass sheet on the side away from said photocell, and a thin metallic coating deposited on said fluorescent layer on the side away from said lead glass sheet.

FREDERIC FUA.
ROBERT C. WOODS.

References Cited in the file of this patent

UNITED STATES PATENTS

| Number | Name | Date |
| --- | --- | --- |
| 1,532,782 | Sheppard et al. | Apr. 7, 1925 |
| 2,177,360 | Busse | Oct. 24, 1939 |
| 2,189,623 | Bourland | Feb. 6, 1940 |
| 2,233,786 | Law | Mar. 4, 1941 |
| 2,401,288 | Morgan et al. | May 28, 1946 |
| 2,409,162 | Staud | Oct. 8, 1946 |

FOREIGN PATENTS

| Number | Country | Date |
| --- | --- | --- |
| 482,354 | Great Britain | June 19, 1936 |
| 559,341 | France | June 14, 1923 |
| 560,001 | France | June 27, 1923 |